T. PIPER.
Machines for Cutting Grass Under Water.

No. 154,900. Patented Sept. 8, 1874.

Witnesses:

Inventor:
Thomas Piper
by Coburn & Munday
attys

UNITED STATES PATENT OFFICE.

THOMAS PIPER, OF CHICAGO, ILLINOIS.

IMPROVEMENT IN MACHINES FOR CUTTING GRASS UNDER WATER.

Specification forming part of Letters Patent No. 154,900, dated September 8, 1874; application filed June 1, 1874.

*To all whom it may concern:*

Be it known that I, THOMAS PIPER, of Chicago, Illinois, have invented certain Improvements in Floating Mowing-Machines, of which the following is a specification:

This invention relates to a mowing-machine for cutting water-plants, and clearing weeds and grass from the water; useful for clearing the water for ice-making purposes, and for freeing ornamental lakes and bodies of water in parks from unsightly weeds. The machine is chiefly intended to be used for clearing the water of weeds for the purpose of making ice.

The nature of the invention will be fully understood from the following description, the accompanying drawing, and the claims appended hereto.

Figure 1:
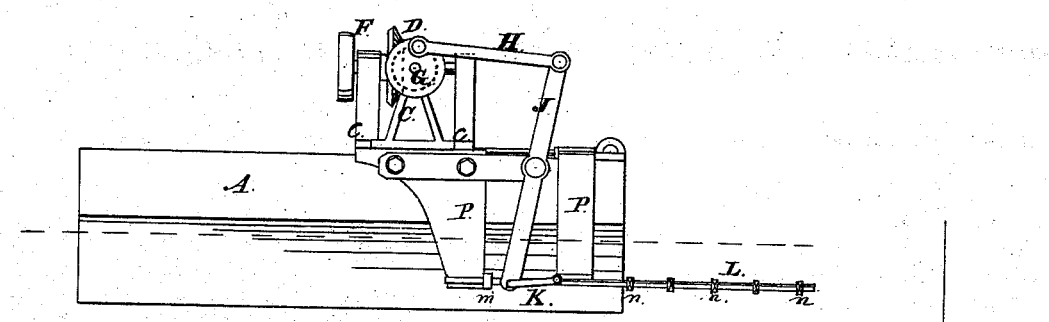
Figure 2:
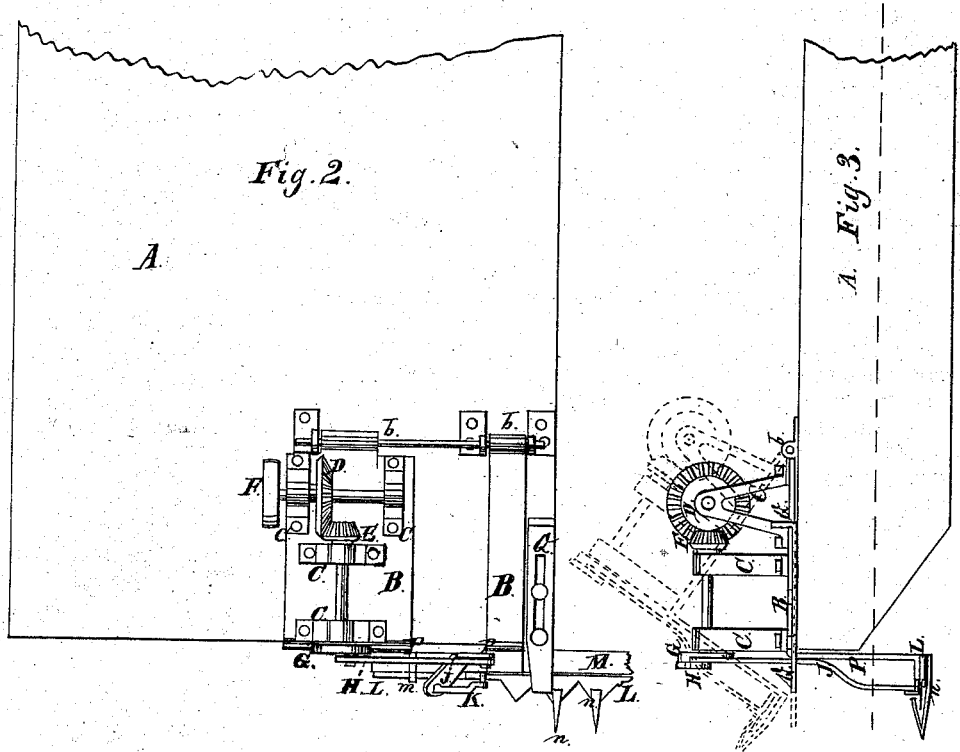

In the accompanying drawing, which forms part of this specification, Figure 1 is a front view of the machine. Fig. 2 is a plan view, and Fig. 3 a side view.

In the said drawing, A represents a boat, which carries a steam-engine, (not shown in the drawing, and is provided with a stern-wheel for driving it through the water, (also not shown.) The mowing mechanism, to be driven by the steam-engine, is mounted upon the bow of the boat, in such position that the sickle-bar projects out to one side, so that the swath of cut and floating weeds is passed by the boat without danger of entanglement. The mechanism of the mower consists of a frame-work, B, hinged to the deck of the boat at *b*. A superficial frame, C, supports the gearing D E. A band-wheel, F, upon the shaft of D, receives power from the engine, which ultimates in the revolution of the crank-wheel G. A pitman, H, connected to the wrist-pin of the crank-wheel, is attached to the upper end of the centrally-pivoted lever J, the lower end of which is connected by the link K to the back plate of the sickle-bar L, which is of the usual construction, but is elongated at its inner end by the back plate, so that it may be furnished with the slide-loop *m*, connected to the supporting-bar M, which extends out the full length of the sickle-bar, and supports it, and carries the fingers *n*. The dependent standards P P from the frame B support the bar M and sickle at a point below the water-line, said line being indicated in dotted line at Figs. 1 and 3.

It will be observed that the machinery, gear-wheels, and those parts which would be likely to be entangled by the floating weeds after they are cut, are all placed upon the deck, and communication effected by the exceedingly-simple vibrating lever J and link K. This simplicity of construction of the parts below water is very necessary in this kind of machine, on account of the floating weeds.

Figure 3:
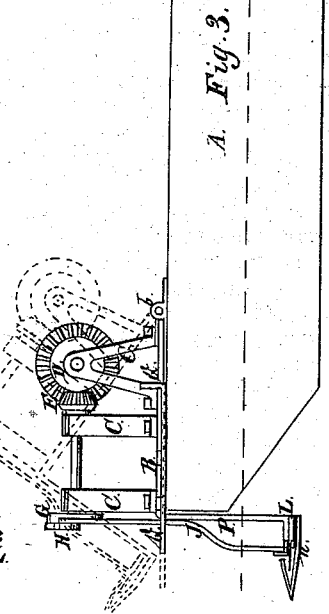

By reason of the hinge *b*, the whole mechanism, including the sickle-bar, may be raised into the position shown in dotted lines at Fig. 3, and secured thus by pushing out the sliding bar or support Q, so that it will rest under the raised sickle-bar. In mowing in shallow water, this frame may be raised to any height desired, and wedged to hold it.

Having thus described my invention, I claim as new and desire to secure by Letters Patent—

1. The sickle L, sickle-bar M, lever J, the dependent standards P P, and the boat A, combined and operating as specified.

2. The frame-work B, pivoted at *b* to the boat A, the dependent standards P P, and sickle-bar M, combined as specified, for raising and lowering the sickle.

THOS. PIPER.

Witnesses:
HEINRICH F. BRUNS,
JOHN W. MUNDAY.